United States Patent
Morris et al.

(10) Patent No.: US 12,384,005 B2
(45) Date of Patent: Aug. 12, 2025

(54) BALL JOINT SYSTEM AND SUPPORT DEVICE

(71) Applicant: New Revo Brand Group, LLC, Plymouth, MN (US)

(72) Inventors: Matt Morris, Minneapolis, MN (US); Ryan Chernik, New Brighton, MN (US); Ryan Jacobson, Andover, MN (US); Howard Tripp, Plymouth, MN (US)

(73) Assignee: NEW REVO BRAND GROUP, LLC, Maple Grove, MN (US)

( * ) Notice: Subject to any disclaimer, the term of this patent is extended or adjusted under 35 U.S.C. 154(b) by 527 days.

(21) Appl. No.: 17/751,101

(22) Filed: May 23, 2022

(65) Prior Publication Data
US 2022/0281076 A1    Sep. 8, 2022

Related U.S. Application Data

(63) Continuation-in-part of application No. 17/455,034, filed on Nov. 16, 2021, now Pat. No. 12,097,593, (Continued)

(51) Int. Cl.
*F16M 11/14* (2006.01)
*A47B 43/00* (2006.01)
(Continued)

(52) U.S. Cl.
CPC ............ *B25B 1/2405* (2013.01); *A47B 43/00* (2013.01); *A47B 81/005* (2013.01);
(Continued)

(58) Field of Classification Search
CPC ......... B25B 5/163; B25B 1/2405; B25B 1/22; B25B 1/103; B25B 5/006; B25B 1/2452; B25B 1/241; B25B 1/2457; F16M 11/14
(Continued)

(56) References Cited

U.S. PATENT DOCUMENTS 488,315 A  *  12/1892  Kane ......................... B25B 1/22
                                                    248/289.11
1,071,289 A     8/1913  Bader
(Continued)

FOREIGN PATENT DOCUMENTS

CN         201192820 Y  *  2/2009
CN         201510751 U  *  6/2010
(Continued)

OTHER PUBLICATIONS

Best Gun Vise By Real Avid Master Gun Vise Review Myth Buster Approved!; found at: https://www.youtube.com/watch?v=bkBN5lpq1Fo (Year: 2022).*
(Continued)

*Primary Examiner* — Mahdi H Nejad
(74) *Attorney, Agent, or Firm* — Grumbles Law PLLC (57) ABSTRACT

A firearm maintenance aid can include a firearm vise and a firearm support device. Firearm vise can include vise jaws, a threaded rod connecting vise jaws together, and jaw pin holes in each jaw, the holes extending from an outer surface of a jaw through to an inner surface of each jaw, wherein the holes in the first jaw align with the holes in the second jaw. Firearm support device can include a clamping portion and a supporting portion. The clamping portion can be clamped between the jaws of the firearm vise, can include two parallel clamping faces, and can define vise pin holes that align with the jaw pin holes. The supporting portion can be located opposite the clamping portion and can include a cylindrical shaft. Vise pins can be received by the jaw pin holes and vise pin holes to fixedly connect the support device to the vise.

16 Claims, 8 Drawing Sheets

Related U.S. Application Data which is a continuation-in-part of application No. 16/989,878, filed on Aug. 10, 2020, now Pat. No. 11,493,299, which is a continuation-in-part of application No. 16/545,779, filed on Aug. 20, 2019, now Pat. No. 10,739,101.

(60) Provisional application No. 62/724,279, filed on Aug. 29, 2018.

(51) Int. Cl.
  *A47B 81/00*    (2006.01)
  *A47F 7/00*     (2006.01)
  *B25B 1/02*     (2006.01)
  *B25B 1/10*     (2006.01)
  *B25B 1/22*     (2006.01)
  *B25B 1/24*     (2006.01)
  *B25B 5/16*     (2006.01)
  *B60R 7/14*     (2006.01)
  *F41A 23/18*    (2006.01)
  *F16C 11/10*    (2006.01)

(52) U.S. Cl.
  CPC .............. *A47F 7/0035* (2013.01); *B25B 1/02* (2013.01); *B25B 1/10* (2013.01); *B25B 1/22* (2013.01); *B60R 7/14* (2013.01); *F16M 11/14* (2013.01); *F41A 23/18* (2013.01); *F16C 11/106* (2013.01); *F16M 2200/022* (2013.01)

(58) Field of Classification Search
  USPC ...... 269/6, 75, 283, 274, 271, 257; 362/421; 248/288.31, 181.1
  See application file for complete search history.

(56) References Cited

U.S. PATENT DOCUMENTS

| | | |
|---|---|---|
| 1,205,149 A | 11/1916 | Bovee |
| 2,168,988 A * | 8/1939 | Hultquist .............. F16M 11/28 248/181.1 |
| 2,258,686 A | 10/1941 | Olney |
| 2,290,545 A | 7/1942 | Doering |
| 2,519,107 A | 8/1950 | Brown |
| 2,774,563 A | 12/1956 | Pribis |
| 2,778,257 A | 1/1957 | Linskey et al. |
| 2,877,689 A | 3/1959 | Pribis |
| 2,907,238 A | 10/1959 | White |
| 2,910,310 A * | 10/1959 | Mulac ................. F16C 11/0604 403/77 |
| 2,948,172 A | 8/1960 | Gustav et al. |
| 3,034,809 A * | 5/1962 | Greenberg .......... F16C 11/0628 285/267 |
| 3,072,426 A * | 1/1963 | Gilbert ................ F16C 11/0609 403/115 |
| 3,322,423 A | 5/1967 | Anatoliy et al. |
| 3,463,479 A | 8/1969 | Hennessey |
| 3,718,327 A | 2/1973 | Nunez |
| 3,783,548 A | 1/1974 | Fisher |
| 3,984,092 A | 10/1976 | Fitzpatrick |
| 4,070,011 A | 1/1978 | Glesser |
| 4,184,667 A | 1/1980 | Alessio |
| 4,252,305 A | 2/1981 | Pasch |
| 4,333,132 A * | 6/1982 | Paley ...................... F21V 21/29 362/427 |
| 4,333,385 A | 6/1982 | Culver |
| 4,437,654 A | 3/1984 | Chiappetti |
| 4,438,913 A | 3/1984 | Hylla |
| 4,548,392 A | 10/1985 | Rickling |
| 4,569,530 A | 2/1986 | Cross |
| 4,572,492 A * | 2/1986 | Kawakita ................ B23Q 1/28 269/75 |
| 4,594,805 A | 6/1986 | McClelland |
| 4,807,381 A | 2/1989 | Southard |
| 4,807,861 A | 2/1989 | Kimball |
| 4,824,086 A | 4/1989 | Rickling et al. |
| 4,854,568 A | 8/1989 | Baeza et al. |
| 4,861,010 A | 8/1989 | Neil |
| 4,887,193 A | 12/1989 | Dieckmann |
| 4,893,850 A | 1/1990 | Mizusawa |
| 4,905,550 A | 3/1990 | Albrecht |
| 4,926,722 A | 5/1990 | Sorensen et al. |
| 4,971,301 A | 11/1990 | Yang |
| 4,985,962 A | 1/1991 | Weber |
| 5,025,584 A | 6/1991 | Butterwick |
| 5,058,302 A | 10/1991 | Minneman |
| 5,070,636 A | 12/1991 | Mueller |
| 5,092,572 A | 3/1992 | Litwak |
| 5,094,131 A | 3/1992 | Sorensen et al. |
| 5,210,906 A | 5/1993 | Aihara et al. |
| 5,224,692 A | 7/1993 | Anderson et al. |
| 5,236,183 A | 8/1993 | Curtis |
| 5,243,883 A | 9/1993 | Savage |
| D340,851 S | 11/1993 | Sorensen |
| 5,419,540 A | 5/1995 | Teafatiller |
| 5,497,575 A | 3/1996 | Fried |
| 5,593,147 A | 1/1997 | Read |
| 5,600,913 A | 2/1997 | Minneman |
| 5,664,875 A | 9/1997 | Hegedus |
| 5,690,416 A | 11/1997 | Gennep |
| 5,697,180 A | 12/1997 | Morizio |
| 5,797,670 A | 8/1998 | Snoke et al. |
| 5,847,883 A | 12/1998 | Rispoli |
| 5,853,168 A | 12/1998 | Drake |
| 5,921,536 A | 7/1999 | Bernstein |
| 5,988,616 A | 11/1999 | Fuller et al. |
| 6,029,964 A | 2/2000 | Bohl |
| 6,088,173 A | 7/2000 | Mendelsohn et al. |
| 6,098,498 A | 8/2000 | Ming et al. |
| 6,105,948 A | 8/2000 | Young |
| 6,170,813 B1 | 1/2001 | Bowers |
| D439,487 S | 3/2001 | Renner |
| 6,293,041 B2 | 9/2001 | Weaver |
| 6,305,117 B1 | 10/2001 | Hales |
| 6,338,475 B1 | 1/2002 | Ping |
| 6,347,791 B1 | 2/2002 | Chervenak |
| 6,367,466 B1 | 4/2002 | Nettles, Jr. |
| 6,367,787 B1 | 4/2002 | Poole et al. |
| 6,382,608 B1 | 5/2002 | Michell |
| 6,386,530 B1 | 5/2002 | Marks |
| 6,412,767 B1 | 7/2002 | Beckmann et al. |
| 6,427,376 B1 | 8/2002 | Weber |
| 6,546,662 B1 | 4/2003 | Chong |
| 6,616,295 B2 | 9/2003 | Sako et al. |
| 6,640,666 B2 | 11/2003 | Pliley |
| 6,648,315 B1 | 11/2003 | Lee |
| 6,672,577 B2 | 1/2004 | Murvine |
| 6,672,578 B1 | 1/2004 | Martens |
| 6,676,120 B1 | 1/2004 | Hallbeck et al. |
| 6,685,176 B2 | 2/2004 | Wirth et al. |
| 6,761,278 B2 | 7/2004 | Hyp et al. |
| 6,860,055 B1 | 3/2005 | Walrath |
| 6,877,266 B1 | 4/2005 | Brownlee |
| 6,896,248 B1 | 5/2005 | Andulics |
| 6,929,253 B2 | 8/2005 | Marks |
| 6,957,808 B2 | 10/2005 | Varzino et al. |
| 6,971,643 B1 | 12/2005 | Garrison |
| 7,004,365 B2 | 2/2006 | Ingram |
| 7,017,898 B2 | 3/2006 | Varzino et al. |
| 7,055,813 B2 | 6/2006 | Hexamer, Jr. |
| 7,066,457 B2 | 6/2006 | Gerritsen et al. |
| 7,101,058 B2 | 9/2006 | Prell et al. |
| 7,111,836 B1 | 9/2006 | West |
| 7,168,181 B2 | 1/2007 | Walchak |
| 7,201,541 B2 | 4/2007 | Barmann |
| D543,604 S | 5/2007 | Minneman |
| 7,258,333 B2 | 8/2007 | Hobday |
| 7,281,346 B1 | 10/2007 | Cook et al. |
| 7,290,760 B1 | 11/2007 | Lindsay |
| 7,356,960 B1 | 4/2008 | Knitt |
| 7,367,451 B2 | 5/2008 | Pendergraph et al. |
| 7,370,891 B1 | 5/2008 | Schmitt et al. |
| 7,530,556 B1 | 5/2009 | Zheng |

(56) References Cited

U.S. PATENT DOCUMENTS

| | | | |
|---|---|---|---|
| 7,537,218 B2 | 5/2009 | Wachtler et al. |
| 7,584,690 B2 | 9/2009 | Cauley |
| 7,600,744 B2 | 10/2009 | Liou |
| 7,641,183 B2 | 1/2010 | Fuller et al. |
| 7,651,078 B2 | 1/2010 | Geier et al. |
| 7,690,606 B1 | 4/2010 | Batdorf |
| 7,699,297 B2 | 4/2010 | Cicenas et al. |
| 7,726,478 B2 | 6/2010 | Potterfield et al. |
| 7,735,813 B2 | 6/2010 | Geier et al. |
| 7,774,972 B2 | 8/2010 | Potterfield et al. |
| 7,815,175 B2 | 10/2010 | Cicenas et al. |
| 7,886,474 B2 | 2/2011 | Werner |
| 7,896,322 B2 | 3/2011 | Geler et al. |
| 7,942,392 B2 | 5/2011 | Geier et al. |
| 7,946,071 B2 | 5/2011 | Cauley |
| 7,980,017 B2 | 7/2011 | Harman, III |
| 7,984,895 B2 | 7/2011 | Strauss et al. |
| 7,997,021 B2 | 8/2011 | Cauley et al. |
| 8,011,129 B2 | 9/2011 | Cauley et al. |
| 8,074,340 B2 | 12/2011 | Cicenas et al. |
| 8,167,292 B1 | 5/2012 | Mucciacciaro et al. |
| 8,240,647 B2 | 8/2012 | Geier et al. |
| 8,296,988 B2 | 10/2012 | Yale et al. |
| 8,297,605 B2 | 10/2012 | Lee et al. |
| 8,308,392 B2 | 11/2012 | Yu et al. |
| 8,316,571 B1 | 11/2012 | Holland |
| 8,322,068 B2 | 12/2012 | Wilson |
| 8,322,699 B2 | 12/2012 | Prell et al. |
| 8,342,495 B2 | 1/2013 | Weissenborn |
| 8,382,048 B2 | 2/2013 | Nesper et al. |
| 8,393,106 B2 | 3/2013 | Cauley et al. |
| 8,424,856 B2 | 4/2013 | Lombardi et al. |
| 8,430,383 B2 | 4/2013 | Strauss |
| 8,516,734 B2 | 8/2013 | Yale et al. |
| 8,544,202 B2 | 10/2013 | Bastian, Jr. |
| 8,578,645 B2 | 11/2013 | Cauley |
| 8,590,871 B2 | 11/2013 | Geier et al. |
| 8,621,773 B2 | 1/2014 | Morrow et al. |
| D698,888 S | 2/2014 | Hicks |
| 8,657,127 B2 | 2/2014 | Diaz, Jr. et al. |
| 8,702,076 B2 | 4/2014 | Cicenas et al. |
| 8,707,609 B2 | 4/2014 | Fisher |
| 8,905,391 B2 | 12/2014 | Weissenborn |
| 8,931,193 B1 | 1/2015 | Bogart et al. |
| 8,931,201 B2 | 1/2015 | Gianladis et al. |
| 8,955,544 B2 | 2/2015 | Gurney |
| 8,973,297 B2 | 3/2015 | Boggess et al. |
| 9,004,479 B2 | 4/2015 | Fisher |
| 9,121,423 B2 | 9/2015 | Sharpe et al. |
| 9,134,085 B2 | 9/2015 | Tucker et al. |
| 9,140,512 B2 | 9/2015 | Witchel |
| 9,151,561 B2 | 10/2015 | Morrow et al. |
| 9,187,210 B2 | 11/2015 | Zhu et al. |
| 9,216,485 B2 | 12/2015 | Huang |
| 9,250,034 B2 | 2/2016 | Tucker et al. |
| 9,302,374 B1 | 4/2016 | Cusenza |
| 9,372,041 B1 | 6/2016 | Geissele |
| 9,421,672 B2 | 8/2016 | Rowlay et al. |
| D768,254 S | 10/2016 | Geissele |
| 9,506,711 B2 | 11/2016 | Gomez |
| 9,522,456 B2 | 12/2016 | Cicenas et al. |
| 9,583,083 B1 | 2/2017 | Berlinger |
| 9,616,552 B1 | 4/2017 | McClain |
| 9,618,291 B1 | 4/2017 | Henderson |
| 9,676,079 B2 | 6/2017 | Tropea |
| 9,702,653 B2 | 7/2017 | Cauley, Jr. et al. |
| 9,733,036 B2 | 8/2017 | Tucker et al. |
| 9,737,064 B2 | 8/2017 | Durrant |
| 9,816,546 B2 | 11/2017 | Gomez |
| 9,823,035 B2 | 11/2017 | Geissele et al. |
| 9,885,534 B2 | 2/2018 | Boggess et al. |
| 9,933,226 B2 | 4/2018 | Tucker et al. |
| 9,976,693 B1 | 5/2018 | Delikat et al. |
| 9,995,552 B2 | 6/2018 | Cuddeback |
| 10,011,005 B2 | 7/2018 | Shute et al. |
| 10,024,621 B2 | 7/2018 | Hutson |
| 10,040,172 B2 | 8/2018 | Weissenborn |
| 10,178,209 B1 | 1/2019 | Hesse |
| 10,209,023 B1 | 2/2019 | Stuart |
| D844,093 S | 3/2019 | Shelton et al. |
| 10,317,162 B2 | 6/2019 | Morrow et al. |
| 10,384,331 B2 | 8/2019 | Maggert |
| D870,840 S | 12/2019 | Cheng et al. |
| 10,514,225 B2 | 12/2019 | Cauley, Jr. et al. |
| 10,563,945 B2 | 2/2020 | Tucker et al. |
| 10,684,090 B2 | 6/2020 | Agnelli, Jr. |
| 10,782,085 B2 | 9/2020 | Cauley, Jr. et al. |
| 10,858,160 B2 | 12/2020 | Yang |
| 10,859,336 B2 | 12/2020 | Morrow et al. |
| 10,890,406 B1 | 1/2021 | Whang |
| 10,919,141 B2 | 2/2021 | Omry et al. |
| 10,962,167 B2 * | 3/2021 | Karman .............. G03B 17/561 |
| 11,009,306 B2 | 5/2021 | Cauley, Jr. et al. |
| 11,079,195 B2 | 8/2021 | Silver et al. |
| 11,274,903 B2 | 3/2022 | Kokoruda et al. |
| 11,472,005 B2 | 10/2022 | Wang |
| 11,493,299 B2 | 11/2022 | Jacobson et al. |
| 2002/0000503 A1 * | 1/2002 | Fidler .................. F16C 11/106 403/90 |
| 2002/0043752 A1 | 4/2002 | Reed et al. |
| 2002/0171191 A1 | 11/2002 | Hudson |
| 2003/0160373 A1 | 11/2003 | Yang |
| 2004/0195479 A1 | 10/2004 | Gulley |
| 2005/0111214 A1 | 5/2005 | Zeiler |
| 2005/0115137 A1 | 6/2005 | Minneman |
| 2005/0188578 A1 | 9/2005 | Engel |
| 2005/0230334 A1 | 10/2005 | MacDonald et al. |
| 2006/0226588 A1 | 10/2006 | Khachatoorian et al. |
| 2007/0294929 A1 | 12/2007 | Potterfield et al. |
| 2008/0018062 A1 | 1/2008 | Wachtler et al. |
| 2008/0210832 A1 * | 9/2008 | Speggiorin ............... F16P 1/00 248/183.1 |
| 2009/0193703 A1 | 8/2009 | Riley |
| 2009/0229160 A1 | 9/2009 | Elliott et al. |
| 2009/0273132 A1 | 11/2009 | Parks et al. |
| 2009/0278296 A1 | 11/2009 | Fulcher et al. |
| 2010/0089294 A1 | 4/2010 | Medina |
| 2010/0126055 A1 | 5/2010 | Potterfield |
| 2011/0192069 A1 | 8/2011 | Potterfield et al. |
| 2012/0227305 A1 | 9/2012 | Fontenot et al. |
| 2012/0255212 A1 | 10/2012 | Werner |
| 2012/0267890 A1 | 10/2012 | Gurney |
| 2013/0086835 A1 | 4/2013 | Minneman |
| 2013/0270758 A1 | 10/2013 | Wittliff, III et al. |
| 2014/0075817 A1 | 3/2014 | Gomez et al. |
| 2014/0246824 A1 | 9/2014 | Fiegener et al. |
| 2014/0319147 A1 | 10/2014 | Horovitz et al. |
| 2015/0014911 A1 | 1/2015 | Melanson |
| 2015/0115114 A1 | 4/2015 | White |
| 2015/0354913 A1 | 12/2015 | Morrow et al. |
| 2016/0202008 A1 | 7/2016 | Geissele |
| 2016/0339562 A1 | 11/2016 | Myers |
| 2017/0018303 A1 | 1/2017 | Yang et al. |
| 2017/0108303 A1 | 4/2017 | Gomez et al. |
| 2017/0216997 A1 | 11/2017 | Smith et al. |
| 2018/0117738 A1 | 5/2018 | Klumper |
| 2019/0162499 A1 | 11/2019 | Jacobson |
| 2020/0180115 A1 | 6/2020 | Yang |
| 2021/0170549 A1 | 6/2021 | Wang |
| 2022/0281076 A1 | 9/2022 | Morris et al. |
| 2024/0044602 A1 | 2/2024 | Morris et al. |

FOREIGN PATENT DOCUMENTS

| | | | |
|---|---|---|---|
| CN | 103056790 A | 4/2013 | |
| CN | 104117938 A * | 10/2014 | .......... B25B 1/2405 |
| CN | 203956763 U | 11/2014 | |
| CN | 104889768 A | 9/2015 | |
| CN | 206316953 U | 7/2017 | |
| CN | 111113099 A | 5/2020 | |
| CN | 115530723 A * | 12/2022 | |
| DE | 2131378 A1 | 12/1972 | |
| DE | 8612639 U1 | 6/1987 | |
| DE | 3700955 C2 | 10/1991 | |

(56) References Cited

FOREIGN PATENT DOCUMENTS

| | | | |
|---|---|---|---|
| DE | 102006018239 A1 * | 10/2007 | .......... F16C 11/0661 |
| DE | 102013004952 A1 | 3/2014 | |
| DE | 202014006697 U1 | 10/2014 | |
| DE | 102018005857 A1 | 1/2020 | |
| EA | 027332 B1 | 7/2017 | |
| EP | 0201817 A3 | 7/1988 | |
| EP | 3220036 A1 * | 9/2017 | .............. F16C 11/06 |
| FR | 2523891 B1 | 1/1985 | |
| FR | 3032784 A1 | 8/2016 | |
| GB | 415518 A | 8/1934 | |
| GB | 662672 A | 12/1951 | |
| GB | 707546 A | 4/1954 | |
| GB | 2046655 B | 4/1983 | |
| GB | 2345656 A | 7/2000 | |
| GB | 2426948 B | 5/2007 | |
| JP | 3211200 U | 6/2017 | |
| TW | I417503 B | 12/2013 | |
| WO | 8601267 A1 | 2/1986 | |
| WO | 2017088030 A1 | 6/2017 | |
| WO | 2017184078 A1 | 10/2017 | |

OTHER PUBLICATIONS

Master Gun Vise™ Overview—Gun DIY® Found at: https://www.youtube.com/watch?v=3qmluUyF5z0 (Year: 2021).*
PANAVISE Precision Vise Combinations (Year: 2024).*
The IQ VISE will Forever change the way you work!! Found at: https://www.youtube.com/watch?v=OwgPuD74sFY (Year: 2024).*
Stanley Maxsteel Multiangle Vise review Found at: https://www.youtube.com/watch?v=cxXh0YTuKKk (Year: 2018).*
Best Tools | Stanley 183069 Multi Angle Hobby Vice Review Found at: https://www.youtube.com/watch?v=BRJlD7JhHyk (Year: 2017).*
Stanley Vice Found at: https://www.youtube.com/watch?v=yqlIXsMqA_Y (Year: 2017).*
2pcs Vise Jaws,5.5' Multi-Groove Magnetic Soft Bench Vise Vice Jaw Pad Accessories. Retrieved Jul. 2020. https://www.amazon.com/2pcs-Multi-Groove-Magnetic-Bench-Accessories.
3-Axis Precision Tilting Vise 3" Jaw Width. Retrieved Jul. 2020. https://www.wiltontools.com/us/en.
Berry's Bullets, VersaCradle Machine Vise System, https://www.berrysmfg.com/product/vc-vise, accessed May 5, 2022.
CB01 C-Clamp + High Weight Load Inner Ball Magic Grip. Retrieved Jul. 2020. https://www.digitalfoto.cn/cb01-c-clamp-high-weight-load-inner-ball-magic-grip.
Howard's Total Vise, The Crossover Vise System, https://www.totalvise.com/?gclid=CjwKCAjw682TBhATEiwA9crl34dV7...8v9kBGWe6A1fjeVrnWaz7gn6LZB7uijtehys6HdN8hqRnNdxoCEw4QAvD_BwE, accessed May 5, 2022.
Hyskore Cleaning & Sighting Vise. Retrieved Jan. 2020. https://www.amazon.com/HYSKORE-1003627-Hyskore-Cleaning-Sighting.
HYSKORE Professional Shooting Accessories, #30278 Bench Top 360 Armorer's Vise, https://hyskore.com/products/30278-bench-top-360°-armorers-vise/, accessed May 5, 2022.
Kurt Workholding. Retrieved Jul. 2020. https://www.kurtworkholding.com/product/kurt-3-in-one-system-jaw-plates/.
Lyman Revolution Gun Vise. Retrieved Jan. 2020. https://www.midwayusa.com/product.
Mission Automotive Store, Vise Soft Jaws / Vice Jaw Pads—Magnetic—4.5 Inch Length, Multi-Groove Design, Durable TPU Rubber Covers—Fit Wide Array of Vises / Vices and Blocks (4 5 6 In)—By Mission Automotive, https://www.amazon.com/Vise-Soft-Jaws-Vice-Pads/dp/B01FT2QTDA, accessed Feb. 10, 2022.
Model:346NM Deluxe Non-Marking Neoprene Jaw Pads. Retrieved Jul. 2020. https://www.panavise.com/index.html.
Monsterballvise. Retrieved Jan. 2020. https://www.monsterballvise.com/index.htm.
Multi-Angle Base Vise. Website. Retrieved Jan. 2020. https://www.stanleytools.com/products/hand-tools/manual-fastener-tools/spring-metal-angle/multiangle-base-vise/83-069m.

OTIS Technology, Soft Vise Jaws, https://otistec.com/otis-soft-vise-jaws/, accessed Feb. 10, 2022.
Stanley Maxsteel Multi Angle Vice. Website. Retrieved Jan. 2020. https://www.youtube.com/watch?v=jSE2gOqQlvE.
Tipton Gun Vise. Retrieved Jul. 2020. https://www.midwayusa.com/product/101491760.
Ultimate Versatile Vise. Retrieved Jul. 2020. https://www.garrettwade.com/ultimate-versatile-vise.html.
U.S. Appl. No. 13/562,651, p. 1-353, filed Mar. 17, 2017, United States.
VJ-6A060201MR—Mahcine Reversible Aluminium Vise Soft Jaws for a 6' Vise.. Retrieved Jul. 2020. https://www.amazon.com/VJ-6A060201MR-MACHINE-REVERSIBLE-ALUMINIUM-VISE.
Wilton Junior 343 Pow-R-Arm. Retrieved Jan. 2020. https://www.northerntool.com/shop/tools/product_200711704_2007.
Office Action pertaining to corresponding U.S. Appl. No. 17/455,034, mailed May 1, 2024.
Final Rejection for corresponding U.S. Appl. No. 17/455,034, mailed Feb. 20, 2024.
Final Rejection pertaining to U.S. Appl. No. 17/455,034, mailed May 22, 2024.
Notice of Allowance pertaining to corresponding U.S. Appl. No. 16/989,878, mailed Aug. 2, 2022.
NPL: https://gunmagwarehouse.com/blog/real-avid-new-ar-building-tools-shot-show-2018/ Jan. 29, 2018, pp. 9-12.
Office Action pertaining to U.S. Appl. No. 16/989,878, mailed Feb. 2, 2022.
Final Rejection received for corresponding U.S. Appl. No. 18/536,476, mailed Sep. 20, 2024.
Amazon, Gun Fit Jaws, Retrieved from: https://www.amazon.com/s?k=gun+fit+jaws&hvadid=634501801402&hvdev=c&hvlocphy=1018671&hvnetw=g&hvqmt=e&hvrand=13330848230366123960&hvtargid=kwd- (Year: 2023).
Master Gun Vise™ Gun-Fit™ (from Real Avid), Retrieved from: https://www.youtube.com/watch?v=Azx8037Vja8 (Year: 2022).
Office Action pertaining to corresponding U.S. Appl. No. 17/455,034, mailed Dec. 12, 2023.
Panavise, Deluxe Jaw Pads; Found at: https://web.archive.org/web/20100322210148/https://www.panavise.com/index.html?pageI D=1 &id 1 = 1 &startat= 1 &-- woSECTIONSdatarq=1 &--SECTIONSword=ww (Year: 2010).
PanaVise-346-datasheet Catalogue (Year: 2023).
Alzo, Digital 12.5" Flexible Spring Steel Arm with 5/8" Aluminum Sockets, Up to 4 lbs Capacity, https://www.adorama.com/az1937.html, accessed Feb. 16, 2023.
Garrett Wade, Versa Vide: Ultimate Versatile Vise, https://www.garrettwade.com/ultimate-versatile-vise.html, accessed Jul. 9, 2020.
Global Industrial, Plano Molding 191900 110 Quart Mobile Storage Trunk, https://www.globalindustrial.com/p/plano-110-quart-mobile-storage-trunk-38-1-4-l-x-18-1-2-w-x-21-3-4-h-black?infoParam.campaignId=T9F&gclid=CjwKCAiAqt-dBhBcEiwATw-ggDCai7CnjDTc1lNG1mZwCRoSpctSC2fMgT9FtWurk6j6j6y8x1UA7BoC2zMQAvD_BwE, accessed Jan. 6, 2023.
Husky, 20-Gal. Professional Duty Waterproof Storage Container with Hinged Lid in Red, https://www.homedepot.com/p/Husky-20-Gal-Professional-Duty-Waterproof-Storage-Container-with-Hinged-Lid-in-Red-246842/311485319, accessed Jan. 5, 2023.
Kupo, D700912 Mini Flex Arm with Alligator Clip, https://www.markertek.com/product/kupo-d700912/kupo-d700912-mini-flex-arm-w-alligator-clip, accessed Feb. 16, 2023.
Lyman, Revolution Rotating Gun Vise, https://www.sportsmansguide.com/product/index/lyman-revolution-rotating-gun-vise?a=471500, accessed Jul. 28, 2020.
Modul-System, Multi-Box—The 'Smart' Multi-Purpose Tool Box, https://www.modul-system.com/en/news/2019/april/multi-box-the-smart-multi-purpose-tool-box--1658, accessed Jan. 6, 2023.
MTM Case-Gard, GV30—Gun Vise for Gunsmithing work and Cleaning Kits, https://mtmcase-gard.com/products/gun-vise-for-gunsmithing-work-and-cleaning-kits, accessed Jan. 6, 2023.
MTM Case-Gard, RMBC-11—Shooting Range Box & Maintenance Center, https://mtmcase-gard.com/products/shooting-range-box-n-maintenance-center, accessed Jan. 6, 2023.

(56) References Cited

OTHER PUBLICATIONS

Notice of Allowance for corresponding U.S. Appl. No. 17/455,034, mailed Jun. 14, 2024.
Ozgkee, Helping Hands Soldering Station, Flexible Arms Angle Adjustable Hands Soldering Station with 3X Magnifier for Maintenance Electronic Repair Soldering Jewelry Crafts, https://www.amazon.com/Ozgkee-Soldering-Adjustable-Maintenance-Electronic/dp/B0BNL4B95T/ref=sr_1_4?crid=3RZWJKLIAY75L&keywords=Ozgkee+Helping+Hands+Soldering+Station+flexible+arms&qid=1676566534&s=hi&sprefix=ozgkee+helping+hands+soldering+station+flexible+arms%2Ctools%2C143&sr=1-4, accessed Feb. 16, 2023.
Plano Store UK, Camo Storage and Gun Cleaning Shooters Case, https://www.planostore.com/gun-cleaning-station-and-storage-system-shooters-case, accessed Nov. 14, 2022.
Tipton, Compact Range Vise, https://www.tiptonclean.com/gun-vises/compact-range-vise/282282.html, accessed Nov. 14, 2022.
Tipton, Gun Vise, https://www.tiptonclean.com/gun-vises/gun-vise/782731.html, accessed Jan. 6, 2023.
Wimberley, The Ground Plamp, https://www.bhphotovideo.com/c/product/1275647-REG/wimberley_pp_400_plamp_stake_pp400.html, accessed Feb. 16, 2023.
Office Action pertaining to corresponding U.S. Appl. No. 18/536,476, mailed Jun. 20, 2024.
Office Action pertaining to corresponding U.S. Appl. No. 18/536,476, mailed Oct. 18, 2024.

\* cited by examiner

BALL JOINT SYSTEM AND SUPPORT DEVICE

FIELD OF THE INVENTION

This disclosure relates to ball joint systems, and more particularly, relates to vises that have ball joint systems.

BACKGROUND OF THE INVENTION

During maintenance activities, devices like firearms (or sub-components thereof) are often held or otherwise supported by clamps, jigs, vises, or other mechanical support arrangements. This can free up an armorer's hands for performing maintenance tasks and can enable greater application of torque to components than, for example, hand-holding. In some cases, however, access to portions of the object being worked upon while using a traditional vise is difficult because the portion of the object being worked upon may not be easily accessible to a user when the object is secured in the vise. Additionally, vises that offer various repositioning options, are inefficient to use. Therefore, it is desirable to provide a vise that can provide secure support for objects being worked upon and can offer the ability for efficient repositioning during maintenance activities.

SUMMARY OF THE INVENTION

This disclosure relates to ball joint systems, and more particularly, relates to vises that have ball joint systems. In an illustrative but non-limiting example, the disclosure provides a ball joint system that can include a plurality of vise jaws and a vise base having a housing and a ball joint. The vise base can connect to the vise jaws via the ball joint. The ball joint can include a ball that is located at least partially within the housing, a stem connected on a first end to the ball and on a second end to a portion of the vise jaws, and a ball lock for securing the ball in a predetermined position within the housing. Further, the ball can include one or more passages through which the ball lock can be inserted to lock the ball in a predetermine position, and the one or more passages can be located at least partially along a bottom surface of the ball.

In some cases, the one or more passages can be at least partially open channels along an exterior surface of the ball such that at least a portion of the ball lock, when inserted into one of the one or more passages, is located directly between the passage and an interior of the housing. In some cases, the one or more passages can be two passages that have surfaces that intersect each other. Further, the one or more passages can be perpendicularly arranged.

In some cases, the one or more passages can extend completely through the ball, and the housing can include a plurality of ball lock holes in at least two sides of the housing, enabling the ball lock to enter into one of the plurality of ball lock holes on one side of the housing and exit out the opposite side. Further, the plurality of ball lock holes can comprise at least two ball lock holes with an entrance for each ball lock hole on a first side of the housing and an exit for each ball lock hole on a second side of the housing, and the ball can be positioned between the entrances and exits of the two ball lock holes. Additionally, the plurality of ball lock holes can further comprise at least one storage hole with an entrance on a first side of the housing and an exit on the second side of the housing, and the ball may not be positioned between the entrance and exit of the storage hole.

In some cases, the ball joint system can further include two inserts, wherein each insert can be attached to a corresponding inner face of the vise jaws, can include a cutout along a top edge, and can be reversible. Sometimes, the ball joint system can further include a cam latch wherein the cam latch can be comprised of a lever and a threaded rod, and the housing can include a threaded receiving cavity for receiving the threaded rod. In some cases, the ball joint system can further include a clamp base attached to the vise jaws.

In another illustrative but non-limiting example, the disclosure provides a ball joint system comprising a base having a housing, and a ball joint. The ball joint can include a ball located at least partially within the housing, a stem connected on a first end to the ball, and a ball lock for securing the ball in a predetermined position within the housing. Further, the ball can include one or more passages that can be structured and configured to pair with the ball lock in a predetermined locking position. The one or more passages can be located at least partially along a bottom of the ball and can be at least partially open along an exterior surface of the ball such that at least a portion of the ball lock, when located in one of the one or more passages, can be located between the passage and the interior of the housing. In some cases, the one or more passages can be two passages that have surfaces that intersect each other and are perpendicularly arranged.

In some cases, the one or more passages can extend completely through the ball, and the housing can include a plurality of ball lock holes in at least two sides of the housing, enabling the ball lock to enter into one of the plurality of ball lock holes on one side of the housing and exit out the opposite side. Further, the plurality of ball lock holes can comprise at least two ball lock holes with an entrance for each ball lock hole on a first side of the housing and an exit for each ball lock hole on a second side of the housing, and the ball can be positioned between the entrances and exits of the two ball lock holes. Additionally, the plurality of ball lock holes can further comprise at least one storage hole with an entrance on a first side of the housing and an exit on the second side of the housing, and the ball may not be positioned between the entrance and exit of the storage hole.

In some cases, the ball joint system further includes a plurality of vise jaws that connect to a second end of the ball joint stem. Additionally, the ball joint system may include two inserts, wherein each insert is attached to a corresponding inner face of the vise jaws. In some cases, the ball joint system can further include a cam latch wherein the cam latch is comprised of a lever and a threaded rod, and the housing includes a threaded receiving cavity for receiving the threaded rod.

In another illustrative but non-limiting example, the disclosure provides a method of using a ball joint system comprising aligning a passage in a ball with a ball lock hole, inserting a ball lock into the ball lock hole of a housing, inserting the ball lock into the passage of the ball to lock the ball at a predetermined angle, and clamping an object between vise jaws. The ball can be part of a ball joint, the ball lock hole can be in a side of the housing, and the housing can house the ball. Further, the vise jaws can be attached to a first end of a ball stem of the ball. In some cases, the method can further comprise the steps of twisting a lever of a cam latch in a first direction to move two halves of the housing closer to each other and rotating the lever upward to further secure the ball in place.

The above summary is not intended to describe each and every example or every implementation of the disclosure.

The Description that follows more particularly exemplifies various illustrative embodiments.

BRIEF DESCRIPTION OF THE DRAWINGS

The following description should be read with reference to the drawings. The drawings, which are not necessarily to scale, depict examples and are not intended to limit the scope of the disclosure. The disclosure may be more completely understood in consideration of the following description with respect to various examples in connection with the accompanying drawings, in which.

DETAILED DESCRIPTION

The present disclosure relates to ball joint systems, and more particularly, relates to vises that have ball joint systems. Various embodiments are described in detail with reference to the drawings, in which like reference numerals may be used to represent like parts and assemblies throughout the several views. Reference to various embodiments does not limit the scope of the systems and methods disclosed herein. Examples of construction, dimensions, and materials may be illustrated for the various elements, those skilled in the art will recognize that many of the examples provided have suitable alternatives that may be utilized. Any examples set forth in this specification are not intended to be limiting and merely set forth some of the many possible embodiments for the systems and methods. It is understood that various omissions and substitutions of equivalents are contemplated as circumstances may suggest or render expedient, but these are intended to cover applications or embodiments without departing from the spirit or scope of the disclosure. Also, it is to be understood that the phraseology and terminology used herein are for the purpose of description and should not be regarded as limiting.

Various known maintenance support devices demonstrate shortcomings that limit their usefulness. Some of these devices only provide for supporting objects in very specific or limited orientations, and some such devices only include minimal features to accommodate clamping by a vise. The present disclosure provides ball joint systems and support devices that can robustly and flexibly support devices, such as firearms, in various orientations according to a user's preference. The ball joint systems and support devices are a maintenance aid that can be used to help a user securely and efficiently clean, maintain, assemble, and disassemble devices such as firearms.

Figure 1:
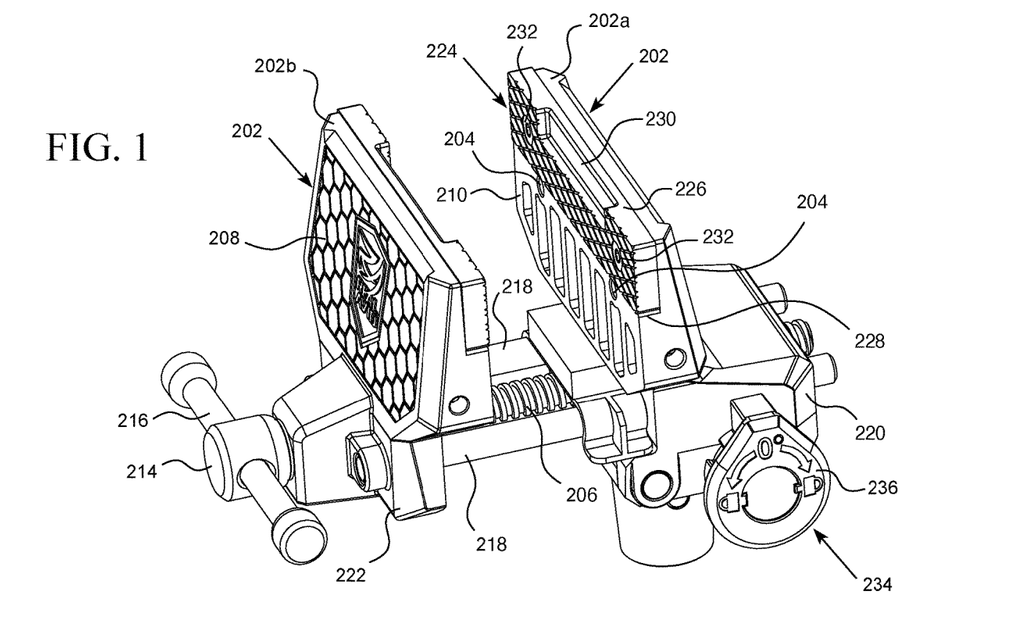
FIG. 1 is a schematic perspective view of an illustrative example of a portion of a vise tool.

Firearm vise 200, as illustrated in FIG. 1, may include a plurality of vise jaws 202 that each have a plurality of jaw pin holes 204. Vise jaws 202 may be connected to each other by threaded rod 206 and may be comprised of first jaw 202a and second jaw 202b. Further, jaw pin holes 204 in one or both of vise jaws 202 may extend from outer surface 208 of the vise jaw through to inner surface 210 of the vise jaw. In some embodiments, some or all of jaw pin holes 204 in first jaw 202a can align with some or all of the jaw pin holes in second jaw 202b. Therefore, when a vise pin is inserted into vise jaws 202, it can insert into both first jaw 202a and second jaw 202b via the aligned jaw pin holes 204.

Figure 2:
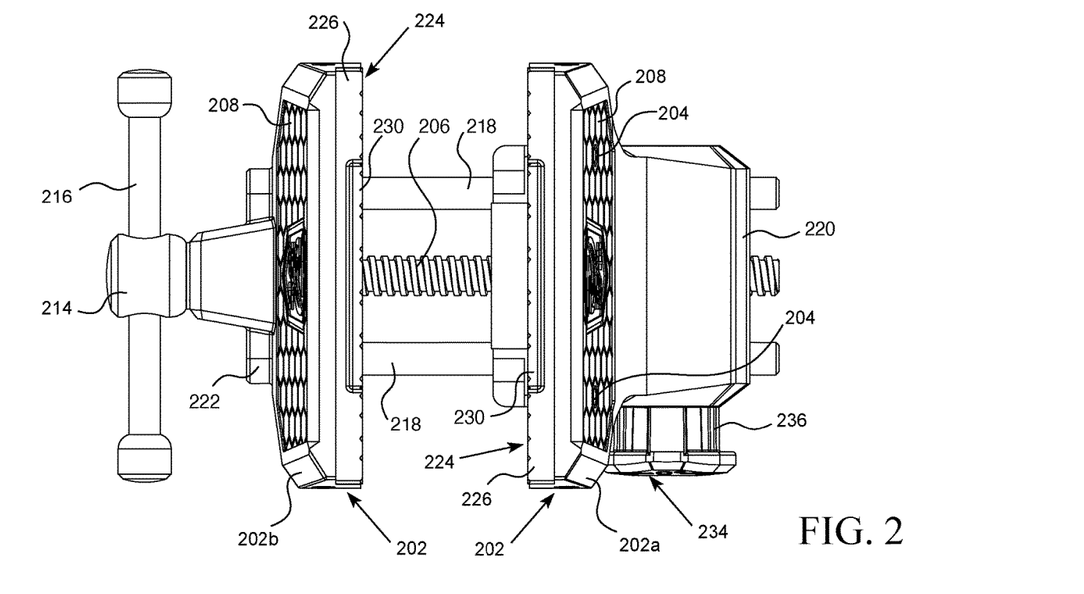
FIG. 2 is a schematic plan view of the vise tool of FIG. 1.
Figure 10:
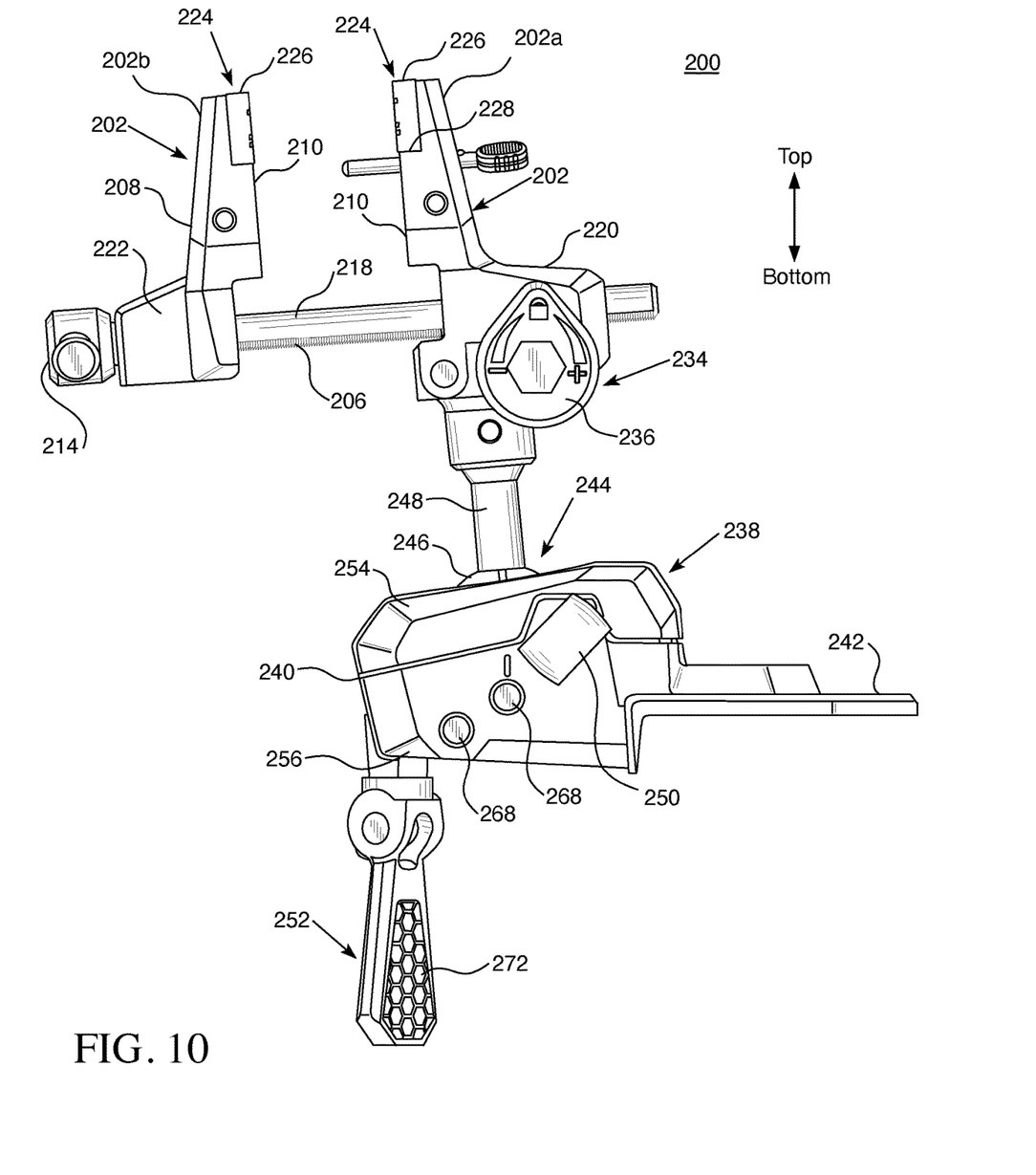
FIG. 10 is a schematic side view of the vise tool of FIG. 1.

In some embodiments, vise jaws 202 may have relatively flat inner faces, and the flat inner faces may be textured to increase friction with a clamped component, such as firearm support device 100. However, a textured surface is not necessary for vise jaws 202 to securely clamp a component, as is described in detail below. Therefore, the inner face of each vise jaw 202 may, alternatively, be smooth. In some cases, inner faces 210 of vise jaws 202 may be parallel to each other and may be mirror images of each other such that when they are moved together so that the inner faces touch, the entire surface of one inner face touches the entire surface of another. However, in other embodiments, the inner faces may have slightly different dimensions and/or sizes such that one is smaller or larger than the other. In addition to inner faces, vise jaws 202 have top and side edges, which may be flat and angled 90 degrees from inner faces 210, as illustrated in FIGS. 1-5 and 10-11, as well as outer faces 208, which may be flat or decoratively patterned. Further, the outer face may be parallel to the inner faces or may slope outward from the top to the bottom, as illustrated in FIGS. 1-2 and 10.

As mentioned above, vise jaws 202 may not need a textured surface to securely clamp a component in place. To accomplish a secure clamp, vise jaws 202 may have a plurality of jaw pin holes 204 into which vise pins 212 can be inserted to lock a clamping component, such as firearm support device 100 having vise pin holes (not shown), in place. Additionally, jaw pin holes 204 in vise jaws 202 may align with each other to enable a vise pin to pass from one vise jaw through to another. More specifically, jaw pin holes 204 may be located in both vise jaws 202a/b and aligned with each other such that one vise pin 212 can be simultaneously connected to a jaw pin hole in each vise jaw. In some embodiments, jaw pin holes 204 may pass from outer surface 208 to inner surface 210 of one or both vise jaws 202. For example, as illustrated in FIGS. 4 and 9-11, first vise jaw 202a may have jaw pin holes 204 that pass from outer surface 208 to inner surface 210 and second vise jaw 202b may have jaw pin holes that are only open to its inner surface. Therefore, when firearm support device 100 is clamped into firearm vise 200, vise pins 212 can be inserted from outer surface 208 of vise pin holes 204 of first vise jaw 202a and through to inner surface 210, through the support device, and into vise pin holes 204 on the inner surface of second vise jaw 202b where they can be stopped by the remaining solid material of the second vise jaw. While vise pin holes 204 are illustrated herein on outer surface 210 of first vise jaw 202a, it is noted that first vise jaw 202b can have vise pin holes 204 that penetrate from the outer surface through to the inner surface as well.

Figure 3:
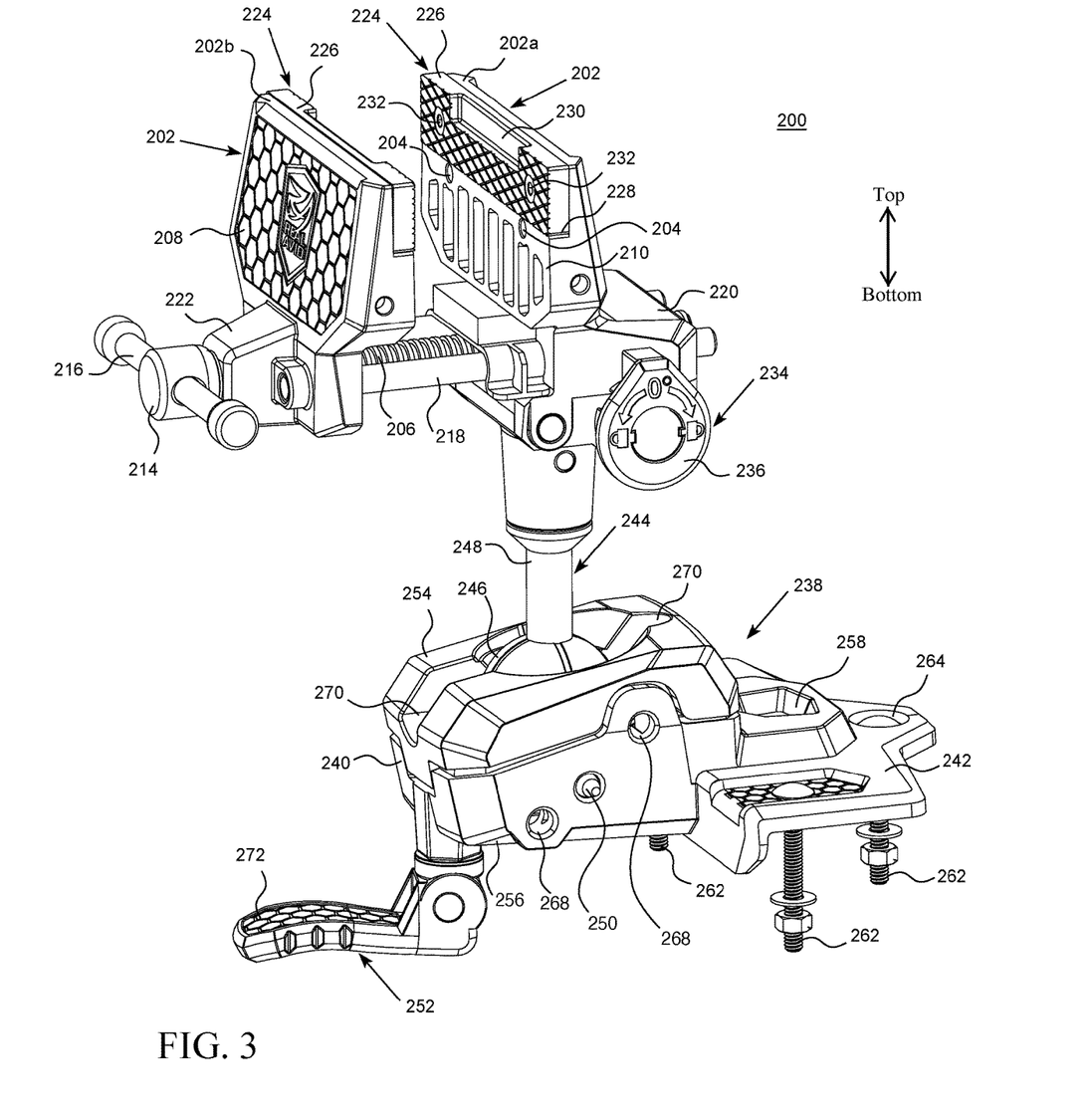
FIG. 3 is a schematic perspective view of an illustrative example of a vise tool.
Figure 4:
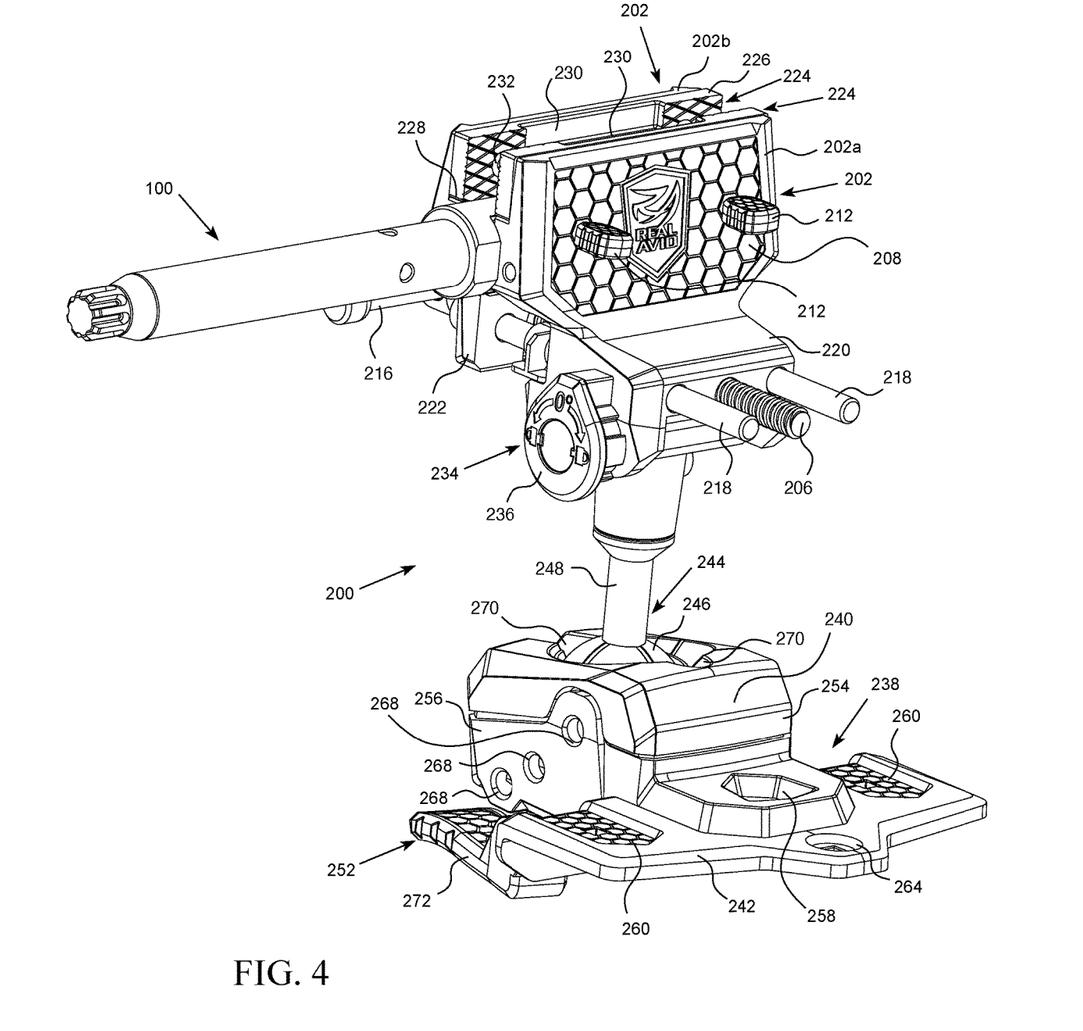
FIG. 4 is a schematic perspective view of a firearm support device clamped in the vise tool of FIG. 3.
Figure 5:
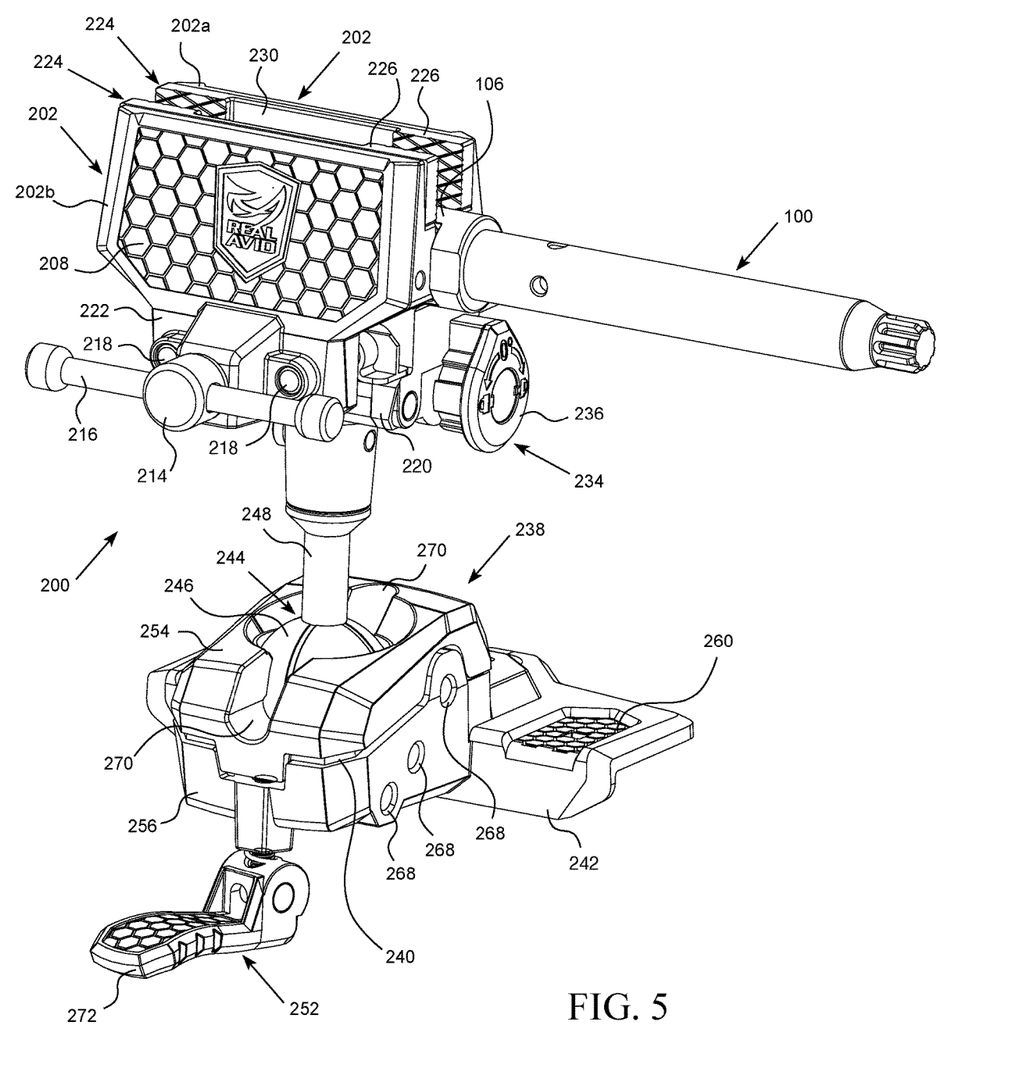
FIG. 5 is a schematic perspective view of a firearm support device clamped in the vise tool of FIG. 3.
Figure 11:
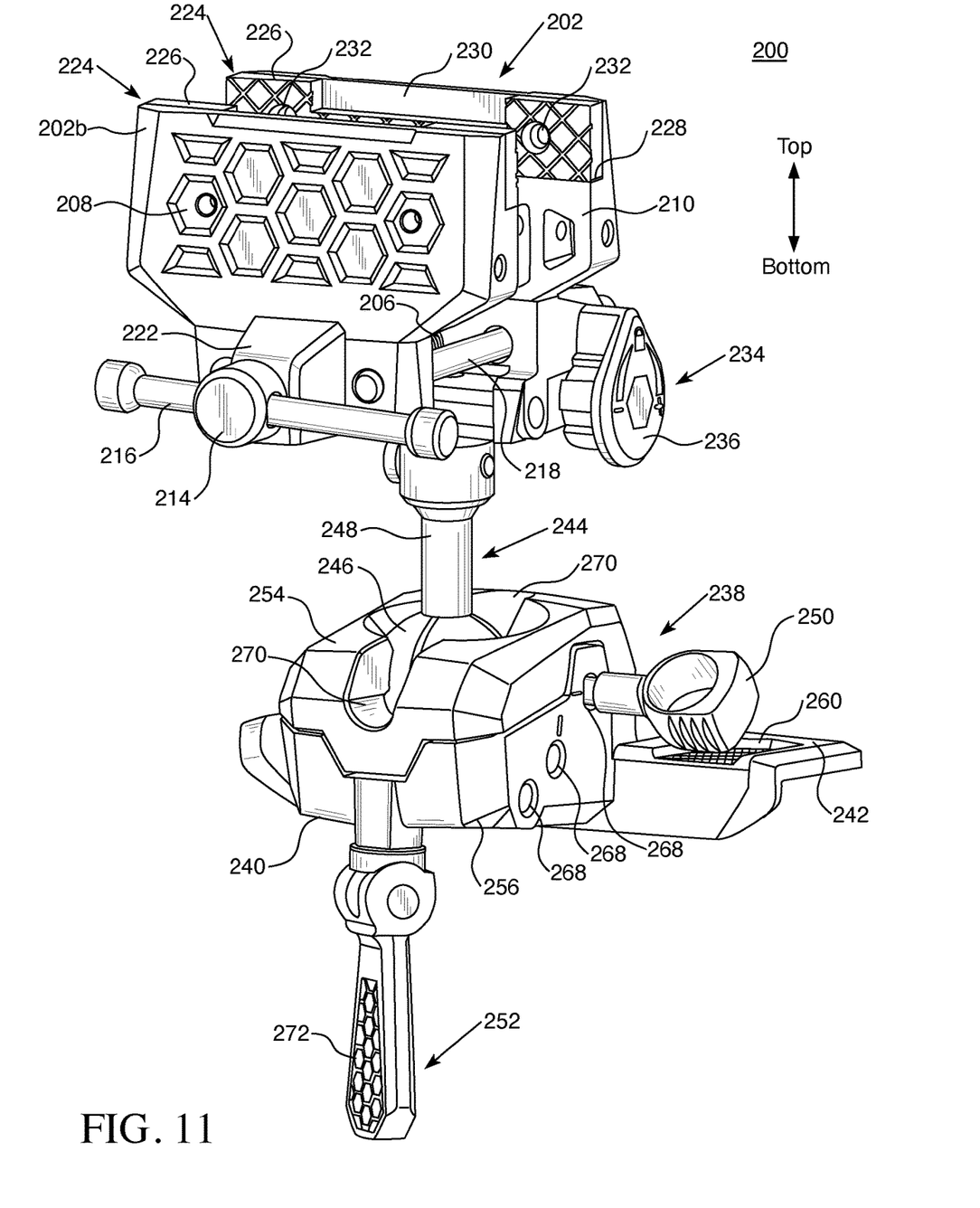
FIG. 11 is a schematic perspective view of the vise tool of FIG. 1.

In some embodiments, jaw pin holes 204 may horizontally align with each other on each vise jaw 202. For example, as illustrated in FIGS. 3-4 and 11, two holes from vise jaw 202 may be aligned along a horizontal line such that they are the same distance from the top and/or bottom of first vise jaw 202a. This allows the component to be locked in a parallel configuration to inner faces 210 of vise jaws 202, as illustrated in FIGS. 4-5. Other jaw pin hole configurations may include two holes aligned along a vertical line such that when firearm vise 200 is upright, the first hole is directly above, or below, the second hole, and the component can be locked perpendicular, or 90 degrees, to inner faces 210. These are not the only alignments or configurations that may be possible. Further alignments or configurations can include any angle such as, but not limited to, jaw pin holes that allow for the component to be locked at a 30-degree angle, a 45-degree angle, and a 60-degree angle to the inner face. There may be several jaw pin holes in each vise jaw such that any or all of the above-mentioned hole configurations are accessible to a user. For example, in one embodiment, each vise jaw may have four vise pin holes, wherein two of the vise pin holes vertically align on one half of the vise jaw, two of the vise pin holes vertically align on another half of the vise jaw, the top two vise pin holes are horizontally aligned with each other, the bottom two vise pin holes are horizontally aligned with each other, and the bottom vise pin holes and their opposite side, top vise pin hole are in 45-degree alignment.

Figure 9:
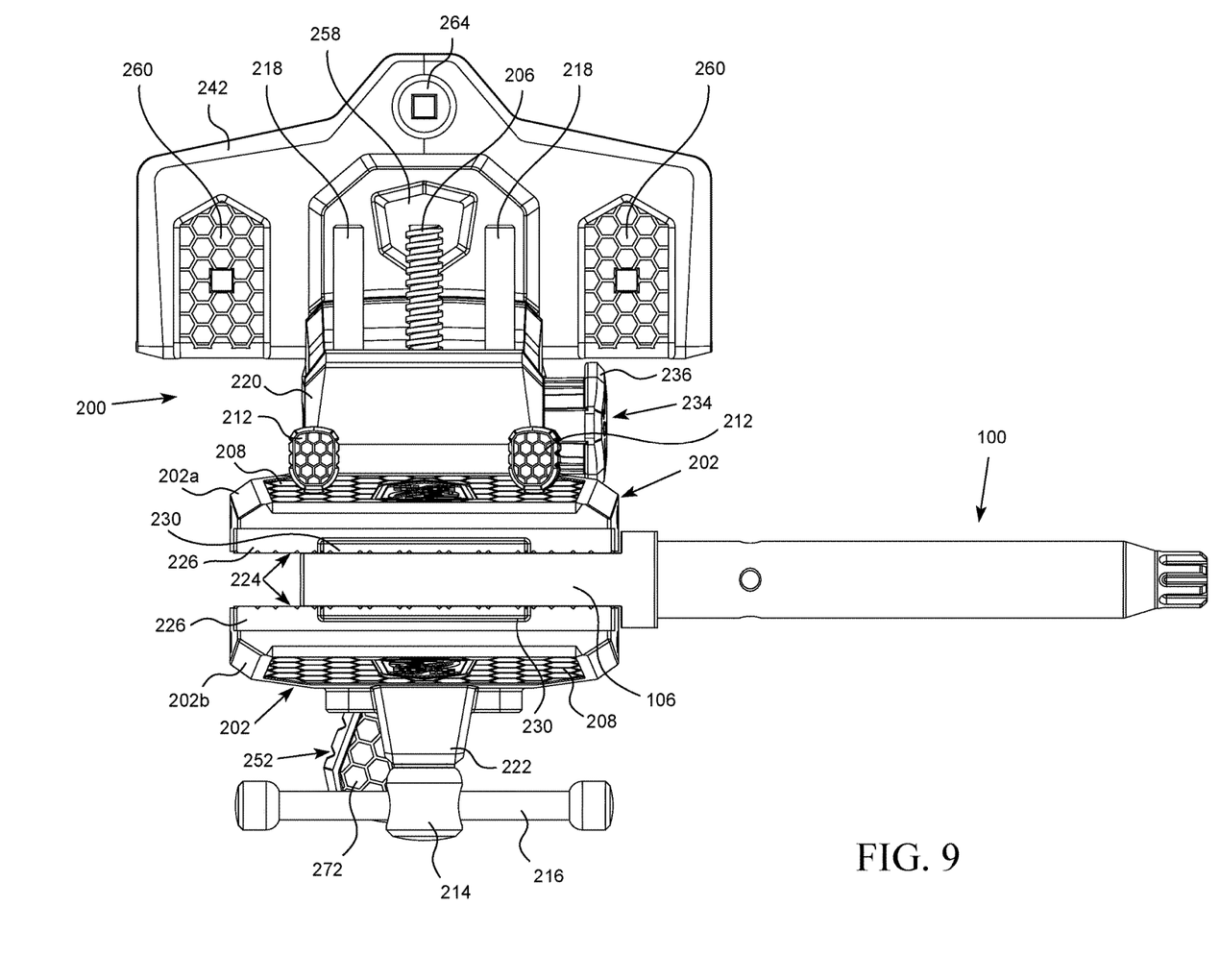
FIG. 9 is a schematic plan view of a firearm support device clamped in the vise tool of FIG. 3.

Vise pins 212 may be structured and configured to be received by any of the plurality of the vise pin holes of clamping portion 106 of firearm support device 100 as well as by any of the plurality of jaw pin holes 204 of vise jaws 202, such that the vise pins are elongate and cylindrical in form and the vise pin holes are similarly shaped and dimensioned to enable a friction fit. More specifically, the external circumference of vise pins 212 may be substantially equivalent, albeit slightly smaller, to the internal circumference of the vise pin holes and jaw pin holes 204. Vise pins 212 may be inserted from the outer surface of vise jaw 202, thereby allowing user to clamp component between the vise jaws prior to inserting the vise pins. Further, as discussed more below, if the clamped component, such as firearm support device 100, has pin holes, the clamped component may first be secured between vise jaws 202 and then vise pin 212 can be inserted into one vice jaw, through the clamped component, and into second jaw. If two or more vise pins 212 are used, this can lock the clamped component securely in place for the user to work with. So positioned, the vise pins 212 can serve to define and to assist in maintaining a working angle for the clamped component (for example, firearm support device 100). In some embodiments, the vise pins may be simple cylindrically shaped pins. Alternatively, vise pins 212 may have a head or grip on one end of a cylindrical shaped pin portion, as illustrated in FIGS. 4 and 9-10, to offer users a more ergonomic grip when placing the vise pin through vise jaws 202 and the clamped component. The head or grip may be textured or smooth and may have any ergonomic shape such as an elongated mushroom head, ball, or any other grab point.

To clamp vise jaws 202 on a clamping component, such as firearm support device 100, second jaw 202b may be moveable relative to first jaw 202a, such that the second jaw can move toward and away from the first jaw along threaded rod 206. More specifically, vise jaws 202 may further include bases 220, 222, and the bases may house threaded rod 206, allowing for inner faces 210 of the vise jaws to be free from interference of the threaded rod when clamping onto a component. For example, first jaw 202a may be connected to, or molded from the same part as, clamp base 220, and second jaw 202b may be connected to, or molded from the same part as, jaw base 222. Therefore, jaw base 222 may connect to clamp base 220 via threaded rod 206, enabling second jaw 202b to move relative to first jaw 202a. To enable rotation of threaded rod 206 and movement of one vise jaw toward another, the threaded rod may have a screw head attached on one end. For example, screw head 214 may be attached to threaded rod 206 on an outer portion of jaw base 222 of second jaw 202b, as illustrated in FIGS. 1-3 and 10-11. Further, screw head 214 may have an aperture through which handle 216 is inserted. In some cases, screw head 214 and handle 216 may be one singular molded part and in other cases, they may be separate parts. Handle 216 can be elongated and rigid, such that it will not bend or flex when human pressure is applied to the handle. Additionally, handle 216 may be straight, as illustrated, or have curvature, which can provide an ergonomic grip to user. When handle 216 is turned, it can cause rotation of screw head 214, which can cause rotation of threaded rod 206. Rotation of threaded rod 206 can then cause second jaw 202b to move toward or away from first jaw 202a. For example, clockwise rotation of threaded rod 206 may cause second jaw 202b to move toward first jaw 202a, while counterclockwise rotation of the threaded rod may cause second jaw to move away from first jaw.

In addition to threaded rod 206, jaw base 222 may also be connected to clamp base 220 via one or more guide bars 218. Guide bars 218 may be smooth so as not to provide friction when second jaw 202b moves toward first jaw 202a. Further, guide bars 218 may be cylindrical, as illustrated in FIGS. 3-4, or may have another shape such as rectangular or pyramidal, and they may offer additional support for when heavy components are clamped between vise jaws 202. This additional support may keep vise jaws 202 from becoming misaligned if they are twisted due to torque applied during use of firearm vise 200, and the support may also prevent threaded rod 206 from bending due to having to withstand too much torque. In some embodiments, as illustrated in FIG. 2, firearm vise 200 may include two guide bars 218 that are parallel to, and on opposite sides of, threaded rod 206.

In some embodiments, vise jaws 202 may each have a ledged, upper recess on inner faces 210 such that each vise jaw is compatible with insert 224. Insert 224 may be approximately rectangular with flat inner and outer faces, which may be parallel to each other, may have top long edge 226 and bottom long edge 228, and the upper recess in vise jaws 202 may be approximately the same size and shape as the insert such that when the insert is attached to the vise jaw, the side and upper edges of both the vise jaw and the insert align and the inner faces are on the same plane. In some cases, the inner face of insert 224 may be textured (for example, knurled) and the outer face of the insert may be smooth, although this is not required and either or both faces may be textured or smooth. If the outer face of insert 224 is smooth, the surface of the ledged, upper recess may also be smooth to prevent gaps between the insert and the upper recess when they are connected together. Since insert 224 may be removable, an attachment mechanism can be used to keep the insert connected to vise jaw 202. More specifically, vise jaw 202 and insert 224 may be attached or connected using connections such as, but not limited to, screws 232, as illustrated in FIGS. 1 and 3, snap fit connections, or dove tail connections.

Insert 224 may have cutout or recess 230 along top long edge 226 or bottom long edge 228 that is roughly rectangular. In some embodiments, the cutout/recess is through the entire insert, thereby causing the insert to have a u-shape. In other embodiments, cutout/recess 230 is only a portion of a long edge such that the back of insert 224 remains a complete rectangle, as illustrated in FIGS. 1, 3, 9, and 11. Further, insert 224 may be reversible and, if so, cutout/recess 230 along top long edge 226 may appear to be along a top portion when insert is in one configuration and it may appear to be along a bottom portion when insert is rotated 180 degrees into a reversed configuration.

In some embodiments, if jaw pin holes 204 are located in the region of vise jaws 202 where insert 224 attaches, then in order to retain the securing function of vise pins 212 when the insert is attached to the vise jaw, the insert can have insert pin holes that align with jaw pin holes 204. More specifically, the insert pin holes may be positioned such that they align with jaw pin holes 204 regardless of whether insert 224 is upright or upside down. For example, the insert pin holes may be located in the center of the insert. In other embodiments, the insert may have a first set of holes that align with jaw pin holes 204 in a first configuration and a second set of holes of that align with the jaw pin holes when the insert is in the reversed configuration. However, to simplify the design of firearm vise 200, jaw pin holes 204 may be located beneath the connection region of insert 224 with vise jaws 202, as illustrated in FIG. 3.

In addition to connecting to first vise jaw 202a, clamp base 220 may also include, and be controlled by, leveling knob 234, which may also indirectly control jaw base 222 via its attachment to the clamp base vis-a-vis threaded rod 206. Leveling knob 234 may include a pin/rod (not shown), a spring (not shown), and knob 236 connected to an outer end of the pin/rod. The pin/rod may be locked within clamp base 220 when leveling knob 234 is in its home position. Then, when knob 236 is pulled out, the spring can be compressed, the pin/rod can be pulled out and removed from its home position, and leveling knob 234 may be able to rotate left or right. This left or right rotation can rotate vise jaws 202 a few degrees in one direction or another, which may help to level the vise jaws and the clamped component, such as firearm support device 100, for maintenance or other work. In some cases, when leveling knob 234 is rotated, the pin/rod is structured and configured such that it is prevented from locking back into its home position. However, leveling knob 234 may still provide enough friction and/or pressure to keep vise jaws 202 level until the user resets the leveling knob back into its home position.

In some embodiments, firearm vise 200 may include vise base 238, which can connect to vise jaws 202 via clamp base 220, as illustrated in FIGS. 3-5 and 10-11. Vise base 238 may be used to mount firearm vise 200 to a flat surface such as a workbench or table and may include housing 240, table mount 242, and a table clamp (not shown). Connection of vise base 238 to vise jaws 202 (via clamp base 220, for example) may be via ball joint 244, which can include ball 246, stem 248, ball lock 250, and/or cam latch 252, as illustrated in FIG. 3. Alternatively, connection of vise base 238 to clamp base 220 can also take place by a fixed connection component such as, but not limited to, a rod, neck, or post. Connection by ball joint 244 may allow for fewer jaw pin holes 204 since vise jaws 202 can move the clamped component, such as firearm support device 100, into many positions, angles, and configurations due to the flexibility of the ball joint, whereas connection by a fixed connection component may be more compatible with embodiments of the vise jaws that include additional jaw pin holes since the additional jaw pin holes will enable the clamped component to be moved into more than one secured position.

Housing 240 of vise base 238 may be comprised of one or more parts. In embodiments having ball joint 244 as a connection mechanism between vise base 238 and clamp base 220, housing 240 can have at least two parts, such as top portion 254 and bottom portion 256, to aid in assembly and, as mentioned in more detail below, locking of the ball joint via a clamping mechanism. In embodiments having a fixed connection component, the housing may be limited to one piece. Housing 240 may be either connected to table mount 242 or may be a continuous piece with the table mount such that they are not removable from each other. In some cases, housing 240 may have a top portion separate from a bottom portion and the bottom portion may be one continuous piece with table mount 242. Other configurations are possible.

As mentioned above, table mount 242 and the table clamp (not shown) can secure firearm vise 200 to a flat, working surface such as a workbench or table. Therefore, table mount 242 may have a flat bottom face to increase the amount of surface area in contact with the working surface and to allow for a secure mount to the working surface. The top of table mount 242 may also be flat or may have additional features. For example, the top of table mount 242 may include storage trays, cavities, or pockets 258 for holding tools or firearm parts. In some embodiments, the top of table mount may include recessed portion 260 that is structured and configured to receive a portion of table clamp. Further, housing 240 may connect to table mount 242 along a central portion such that the table mount may have recessed portion 260 on either side of the central portion, as illustrated in FIGS. 4 and 9. This allows for two table clamps to secure table mount 242 to the working surface. More specifically, the table clamp may be a c-clamp and a top arm of the table clamp may nest into recessed portion 260 on table mount 242. This recessed portion may be smooth, or it may have a texture so as to increase friction and prevent unwanted sliding between table mount 242 and a table clamp. Another method for connecting table mount 242 to a work surface is via screws, as illustrated in FIG. 3. More specifically, recessed portion(s) 260 may include holes or openings into which screws 262 can be inserted. Further, table mount 242 may have connection point 264 specifically structured and configured for screw 262, as further illustrated in FIG. 3, wherein the connection point is a recessed portion that is smaller than recessed portion 260 and shaped more similarly to a screw head.

Figure 6:
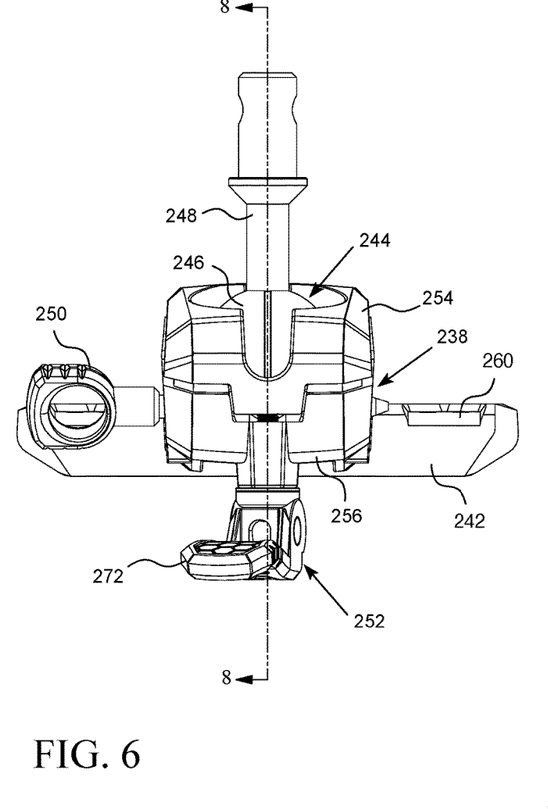
FIG. 6 is a schematic front view of a portion of the vise tool of FIG. 1.

As mentioned above, housing 240, in addition to connecting to table mount 242, can connect to a connection component, such as ball joint 244, to connect vise base 238 to clamp base 220. As illustrated in FIGS. 3, 6 and 11, ball joint 244 may include ball 246, stem 248, and ball lock 250, wherein the stem can be connected on a first end to the ball and on a second end to a portion of vise jaws 202 (for example, clamp base 220), and the ball lock can secure the ball in one or more predetermined positions. Ball 246 may be located at least partially within housing 240 or, alternatively, may be completely surrounded by the housing.

Figure 7:
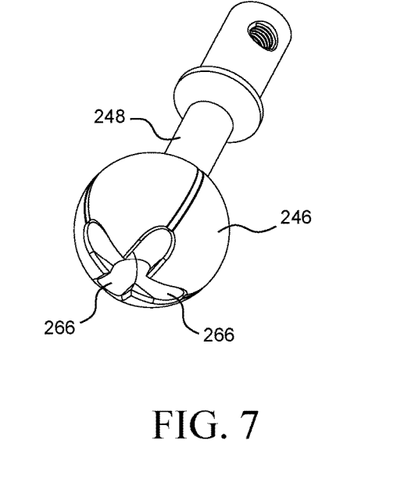
FIG. 7 is a schematic perspective view of a portion of a ball joint of the vise tool of FIG. 1.

In some embodiments, ball 246 may be comprised of one or more passages 266 through which ball lock 250 can be inserted in order to lock the ball in a predetermined position, although in some cases, vise pin 212 and ball lock 250 may be interchangeable so the vise pin may be used instead of the ball lock. More specifically, ball 246 can include two passages 266 that may be located at least partially along a bottom surface of the ball (i.e., opposite the side of the ball that connects to stem 248), may be perpendicular to each other, and may have surfaces that intersect or cross through each other, as illustrated in FIG. 7. Passages 266 may not be entirely internal to ball 246 and at least a portion of the length of each passage may be partially open to the inner surface of housing 240 (for example, a portion of the passage may be a channel that is at least partially open along an exterior surface of the ball) such that at least a portion of ball lock 250 (for example, a lengthwise side of the ball lock), when inserted into a passage, is not completely surrounded by the ball and may be exposed to the interior of the housing. More specifically, the part of ball lock 250 that is in the option portion of passage 266 can be located directly between the surface of the passage and the interior of housing 240. In some embodiments, passage 266 may be completely open such that the portion of ball lock 250 within housing 240, when inserted into the passage, is located directly between the surface of passage 266 and the interior of the housing. Further, passages 266 may extend completely through ball 246, as illustrated in FIG. 7, or, alternatively, may extend partway into the ball but end prior to reaching the opposite side of the ball.

Since ball 246 can be located within housing 240, the housing may, further, include a plurality of ball lock holes 268 in, for example, at least one side of the housing into which ball lock 250 can be inserted to gain access to passages 266. Ball lock 250 can be elongate and cylindrical in form and ball lock holes 268 can be similarly shaped and dimensioned (i.e., also elongate and cylindrical in form) such that the ball lock can securely fit in a ball lock hole. One embodiment may include at least two ball lock holes 268 in at least one side of housing 240. For example, there may be three ball lock holes 268 in two sides of housing 240 (for example, two opposing sides), as illustrated in the figures. These ball lock holes 268 can enable ball lock 250 to enter into one of the ball lock holes on one side of housing 240 and, in some embodiments, exit out the opposite side of the housing, as illustrated in FIG. 6. More specifically, each ball lock hole may have an entrance on a first side of housing 240 and an exit on a second, opposite side of the housing.

Figure 8:
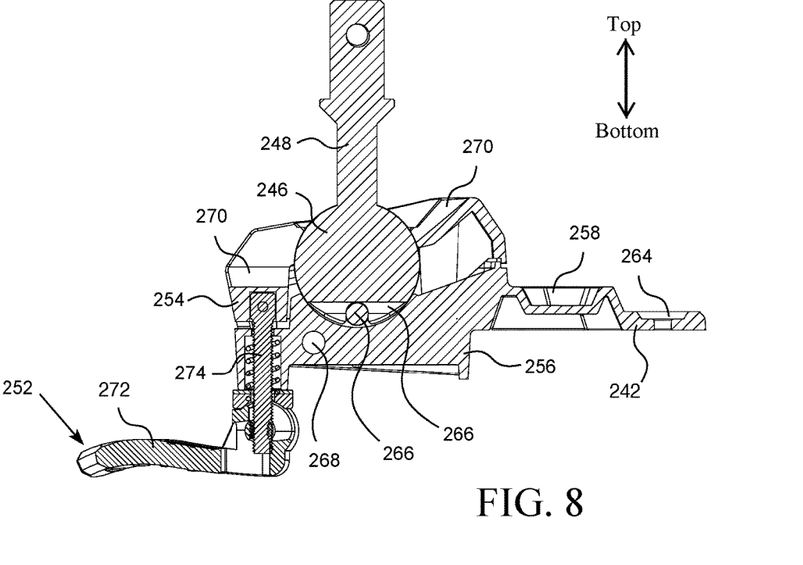
FIG. 8 is a schematic cross-sectional side view of the portion of the vise tool of FIG. 6 taken from the line 8-8 in FIG. 6.

Further, in some embodiments, at least two ball lock holes 268 are configured such that ball 246 is positioned between the entrances and exits of the at least two ball lock holes and ball lock 250, when inserted into the at least two ball lock holes 268 also inserts into one of passages 266. Additionally, a third ball lock hole (for example, the hole closest to cam latch 252 in FIG. 3) can be positioned such that ball 246 is not positioned between the entrance and exit of the third ball lock hole. This third ball lock hole 246 may be used as a storage hole when ball lock 250 is not in use. Therefore, the storage hole is positioned apart from ball 246, as illustrated in FIG. 8, such that insertion of ball lock 250 into the storage hole results in no physical contact with the ball, and the ball lock does not insert into any of passages 266.

Further, as mentioned above, ball 246 can include one or more passages 266 that are structured and configured to pair with ball lock 250 in one or more predetermined locking positions. For example, one embodiment of the device can include two perpendicular passages in ball 246, as illustrated in FIG. 7, that, in combination with ball lock holes 268, enable ball lock 250 to secure ball joint 244 in one of eight positions: vertical and facing forward, left, right, or back when the ball lock is inserted through, for example, a middle ball lock hole (i.e., a ball lock hole approximately centered in the housing), and horizontal and facing forward, left, right, or back when the ball lock is inserted through a back ball lock hole (i.e., a ball lock hole nearest to vise base 238). The top of housing 240 may include recessed passages 270 near its front and back to accommodate stem 248 of ball joint 244 when the ball joint is in a horizontally forward or angled backward position, respectively.

In addition to ball lock 250, which can be used to lock ball 246 securely in place when high amounts of torque may be applied to vise jaws 202, ball joint 244 may include cam latch 252 for securing the ball within housing 240 in additional positions that are not compatible with ball lock holes 268 and the ball lock. Cam latch 252 may help connect top and bottom of housing 254, 256 and can be used to lock ball 246 in any position by compressing the top and bottom of the housing onto the ball. More specifically, cam latch 252 can include lever 272 and threaded rod 274, and top and bottom of housing 254, 256 can have a threaded receiving cavity for receiving the threaded rod. To secure ball 246 in housing 244, lever 272 can be twisted (for example, counterclockwise), thereby turning threaded rod 274 within the threaded receiving cavity and pulling top and bottom of housing 254, 256 toward each other and tightening housing 240 around the ball. Lever 272 of cam latch 252 can then be rotated upward 90 degrees to lock in place, which prevents countertwisting of threaded rod 274 and adds additional compression to ball 246. To loosen ball 246, lever 272 can be straightened, rotated in the opposite direction (for example, clockwise), thereby turning threaded rod 274 within the threaded receiving cavity in the opposite direction and allowing top and bottom of housing 254, 256 to separate from each other and from the ball.

Persons of ordinary skill in arts relevant to this disclosure and subject matter hereof will recognize that embodiments may comprise fewer features than illustrated in any individual embodiment described by example or otherwise contemplated herein. Embodiments described herein are not meant to be an exhaustive presentation of ways in which various features may be combined and/or arranged. Accordingly, the embodiments are not mutually exclusive combinations of features; rather, embodiments can comprise a combination of different individual features selected from different individual embodiments, as understood by persons of ordinary skill in the relevant arts. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

What is claimed is:

1. A ball joint system comprising:
a plurality of vise jaws; and
a vise base having a housing and connected to the vise jaws via a ball joint,
wherein the ball joint includes a ball located at least partially within the housing, a stem connected on a first end to the ball and on a second end to a portion of the vise jaws, and an elongate ball lock for securing the ball at a predetermined angle within the housing to prevent rotation of the ball,
wherein the ball includes one or more passages through which the ball lock is inserted to lock the ball in a predetermined position, the one or more passages being located at least partially along a bottom surface of the ball,
wherein the one or more passages extend completely through the ball, and
wherein the housing includes a plurality of ball lock holes in at least two sides of the housing, enabling the ball lock to enter into one of the plurality of ball lock holes on one side of the housing and exit out the opposite side.

2. The ball joint system of claim 1, wherein the one or more passages are at least partially open channels along an exterior surface of the ball such that at least a portion of the ball lock, when inserted into one of the one or more passages, is located directly between the passage and an interior of the housing.

3. The ball joint system of claim 1, wherein the one or more passages are at least two passages that have surfaces that intersect each other.

4. The ball joint system of claim 3, wherein the at least two passages comprise two passages that are perpendicularly arranged.

5. The ball joint system of claim 1, wherein the plurality of ball lock holes comprise at least two ball lock holes with an entrance for each ball lock hole on a first side of the housing and an exit for each ball lock hole on a second side of the housing, and wherein the ball is positioned between the entrances and exits of the two ball lock holes.

6. The ball joint system of claim 5, wherein the at least two ball lock holes further comprise at least one storage hole with an entrance on a first side of the housing and an exit on the second side of the housing, and wherein the ball is not positioned between the entrance and exit of the storage hole.

7. The ball joint system of claim 1, further comprising two inserts, wherein each insert
is attached to a corresponding inner face of the vise jaws,
includes a cutout along a top edge, and
is reversible.

8. The ball joint system of claim 1, further comprising a cam latch wherein
the cam latch is comprised of a lever and a threaded rod, and
the housing includes a threaded receiving cavity for receiving the threaded rod.

9. The ball joint system of claim 1, further comprising a clamp base attached to the vise jaws.

10. A ball joint system comprising:
a base having a housing; and
a ball joint,
wherein the ball joint includes a ball located at least partially within the housing, a stem connected on a first end to the ball, and a ball lock for securing the ball at a predetermined angle within the housing to prevent rotation of the ball, and
wherein the ball includes one or more passages structured and configured to pair with the ball lock in a predetermined locking position, the one or more passages being located at least partially along a bottom surface of the ball and at least partially open along an exterior surface of the ball such that at least a portion of the ball lock, when located in one of the one or more passages, is located between the passage and an interior of the housing,
wherein the one or more passages extend completely through the ball, and
wherein the housing includes a plurality of ball lock holes in at least two sides of the housing, enabling the ball lock to enter into one of the plurality of ball lock holes on one side of the housing and exit out the opposite side.

11. The ball joint system of claim 10, wherein the one or more passages are at least two passages that have surfaces that intersect each other and are perpendicularly arranged.

12. A ball joint system of claim 10, wherein the plurality of ball lock holes comprise at least two ball lock holes with an entrance for each ball lock hole on a first side of the housing and an exit for each ball lock hole on a second side of the housing, and wherein the ball is positioned between the entrances and exits of the two ball lock holes.

13. The ball joint system of claim 12, wherein the at least two ball lock holes further comprise at least one storage hole with an entrance on a first side of the housing and an exit on the second side of the housing, and wherein the ball is not positioned between the entrance and exit of the storage hole.

14. The ball joint system of claim 10, further comprising a plurality of vise jaws that connect to a second end of the ball joint stem.

15. The ball joint system of claim 14, further comprising two inserts, wherein each insert is attached to a corresponding inner face of the vise jaws.

16. The ball joint system of claim 10, further comprising a cam latch wherein
the cam latch is comprised of a lever and a threaded rod, and
the housing includes a threaded receiving cavity for receiving the threaded rod.

* * * * *